July 1, 1930.  D. K. TROTTER  1,769,086
CULTIVATOR ATTACHMENT FOR TRACTORS
Filed Jan. 3, 1927
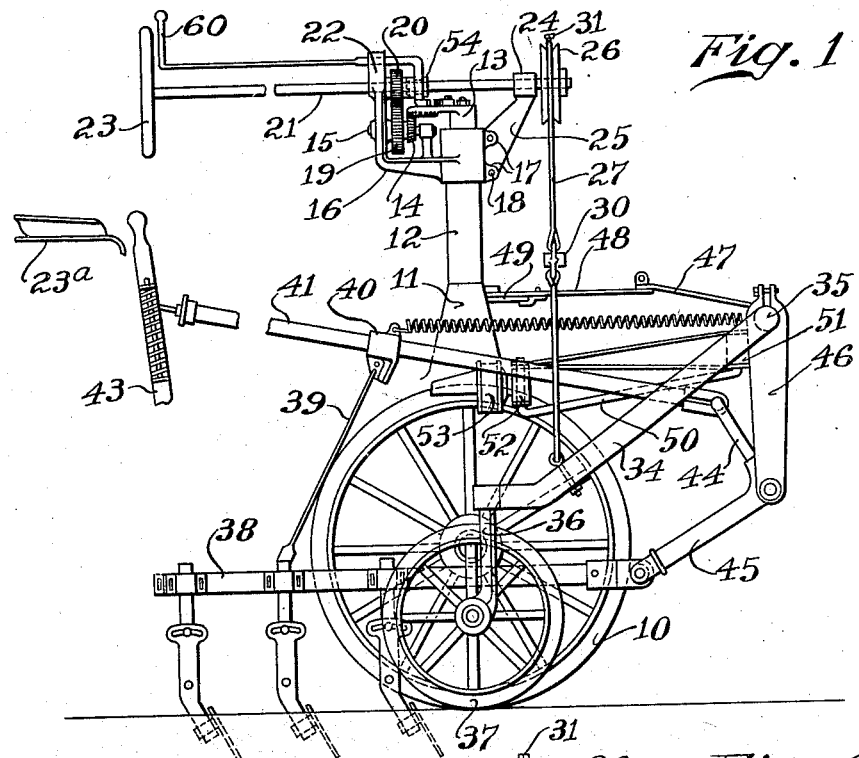
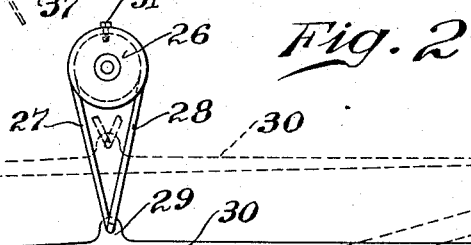
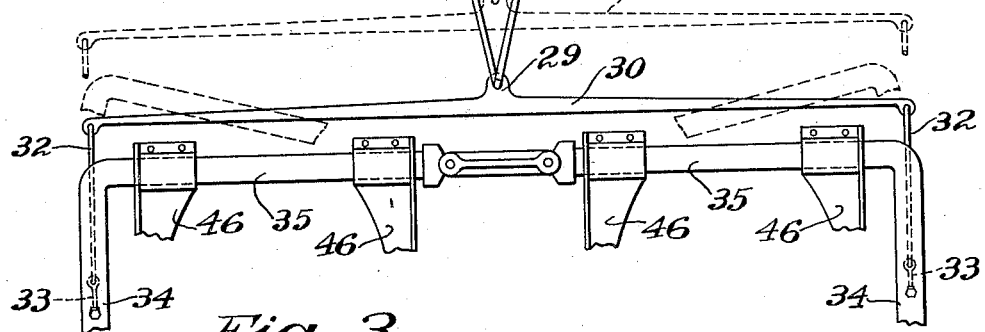
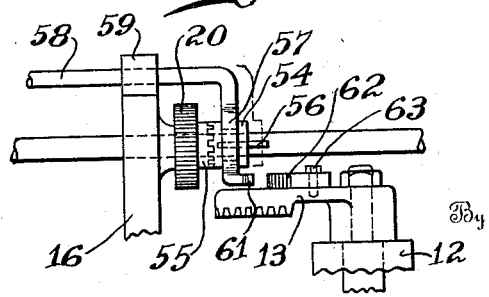
Inventor
D. K. Trotter
By
Attorney Patented July 1, 1930

1,769,086

UNITED STATES PATENT OFFICE

DAVID K. TROTTER, OF TUSCALOOSA, ALABAMA, ASSIGNOR TO INTERNATIONAL HARVESTER COMPANY, A CORPORATION OF NEW JERSEY

CULTIVATOR ATTACHMENT FOR TRACTORS

Application filed January 3, 1927. Serial No. 158,788.

My present invention has relation to cultivating attachments for tractors.

In an application for Letters Patent of the United States filed by me on January 22nd, 1926, Serial No. 82,999, I illustrated and described certain improvements in front cultivating attachments for tractors which was predicated upon the construction shown in the patent to Benjamin, No. 1,539,108, and which distinguished therefrom in substituting for the rigid transverse frame member, to which the cultivating appliances were connected, a member articulated so that its ends were free to have angular play independently in a transverse vertical plane, this play, in the instant construction, being accomplished by pivotally mounting the outrigger supports for the transverse frame member ends so that they would permit both horizontal play to each side of the frame member about a vertical axis and play of the member ends in a vertical transverse plane about horizontal axes substantially parallel with the center line of the tractor.

In the use of my said invention it was found that its operation would be materially improved in respect of dirigibility if provision were made for the convenient control by the operator of the cultivating attachments to lift them from the ground so that the ground wheels and cultivating appliances would not interfere with the dirigibility of the tractor, and would therefore permit of sharp turning of the tractor at the end of rows, either to reverse it or to make sharp right angled turns. In the solution of this problem it was desirable to avoid, as far as possible, changes in the standard tractor parts and to adapt the lifting mechanism to be operated by the driver from his seat, preferably through the agency of the steering wheel, either jointly with or independently of the tractor's steering mechanism. When the steering wheel was so employed, it was found desirable, when operating the lifting means independently of the steering mechanism, to arrange for the latter to be locked so as to hold the tractor wheels in such position as was desirable while manipulating the lifting mechanism.

All of the foregoing objects have been accomplished by my present invention, as applied to front cultivating attachments, by the very simple expedient of extending the horizontal steering rod forward beyond its drive to the steering mechanism of the tractor and mounting on its end reversibly operative means, acting through flexible center connections to a rigid transverse bridle, to lift both ends of the cultivator attachment and with them their supporting ground wheels where such are used, a clutch controllable from the driver's seat being available to disconnect the tractor steering mechanism from the steering rod and, when desired, to lock said latter mechanism until its control was again restored to the steering rod. Obviously such a mechanism represents merely the preferred means for attaining the end in view, and it is to be understood that my present invention covers broadly means controllable from the tractor for lifting from the ground the cultivating attachments whenever located and whether or not supported in part by ground wheels.

In the accompanying drawings I have illustrated a typical embodiment of my present invention.

Fig. 1 illustrates in side elevation a cultivating attachment constructed in accordance with my pending application aforesaid, and shown associated with the steering mechanism and front steering wheels of the tractor, other parts of the tractor being omitted for the sake of clarity.

Fig. 2 is a front elevation illustrating fragmentally the articulated front member to which the cultivating attachments are connected and showing the means for lifting the ends of the cultivator attachments.

Fig. 3 is a detail view showing the clutch control and lock for the steering mechanism of the tractor.

Similar reference numerals refer to similar parts throughout the drawings.

I have shown my invention associated with a conventional type of tractor, which, in its detail structure, forms no part of my present invention and which therefore has not been illustrated except that I show those parts of the tractor with which the cultivator attachment, chosen to illustrate my invention, is associated. The drawings show the front steering truck 10 of the tractor which is controlled in the usual manner by an upright steering post, not shown, which is journaled in the front cross casting 11 and has a housing 12 at the upper end of which is secured a gear sector 13 which meshes with a bevelled gear 14 mounted fast on a shaft 15 that is journaled in the bracket 16. This bracket is suitably clamped to the upper end of the housing 12 by perforated lugs or ears 17 that receive bolts 18. The gear 14 is driven by a pinion 19 fast on the shaft 15, which pinion meshes a pinion 20 loose on the steering rod 21 that is journaled in a bearing 22 on the bracket 16 and extends rearwardly so as to be operated by the steering wheel 23 from the driver's seat 23ª. In the standard construction, the gear 20 is fast on the rod 21 which terminates at that point, but in my present construction an elongated steering rod is employed and its forward end is mounted in a bearing 24 carried by the bracket 25 which is preferably connected to the housing 12 by the same bolts 18 which clamp the bracket 16 thereto. It is contemplated that the bracket 25 can be interposed between the clamp lugs 17, if the spacing of such lugs will permit, or it may be connected by the bolts 18 on either side of the ears 17, or it may be otherwise mounted on the housing 12. The forward overhung end of the steering rod 21 carries a grooved pulley 26 from both sides of which flexible connections 27 and 28 depend and are connected to a perforated lug or ear 29 at the center of a rigid cross bar or bridle 30. The connections 27 and 28 may be formed by a continuous loop of chain, rope, cable, or the like, which is secured to the top of the pulley by a set screw 31, or other equivalent flexible connections may be employed. By this arrangement as the pulley is turned in either direction it will act to lift the suspended bridle. The bridle at its ends is connected by swinging links 32 to the outer ends of the cultivator attachments, the connection shown being by bolts 33 or the like, which are mounted in the lower downturned portions 34 of the ends 35 of the front transverse frame member. Each portion 34 is suitably connected by a bracket 36 to a journal for the ground wheel 37 which supports its respective end 35 and the cultivating attachments connected thereto, which attachments may be of any suitable character, those shown corresponding to the showing in the Benjamin patent aforesaid and being of the two row cultivator type, each cultivator comprising a pair of spaced cultivator beams 38 connected near their rear ends by a spreader arch 39, the upper portion of which is pivotally connected to a collar 40 on a rod 41.

The collar 40 is provided with attaching means for a lifting spring 42, the other end of which is secured to the adjacent member 35 so that when the rod 41 is moved by its respective lever 43 a crank shaft 44 will be swung and the rearwardly extending arms or brackets 45, disposed at right angles to 44, will move upwardly or downwardly and by their pivotal connection to the forward ends of the cultivator beams will act to raise or lower the same and adjust them in the ordinary way to their work. The cranks 44 are pivotally connected to the lower ends of depending arms 46 which are clamped to the members 35. An arm 47, connected to one of the arms 46 at its forward end, is in turn connected by a link or rod 48 to a swinging arm 49 fast on the steering post, not shown, which will act to shift the cultivating attachments laterally in the direction taken by the steering truck.

The members 35 are mounted in the manner described in my pending application aforesaid, which provides forwardly extending outriggers 50 carrying a vertical pivot bearing 51 connected to the adjacent element 35 and at their rear ends mounted in vertical pivot bearings 52 which in turn are pivotally mounted on a horizontal axis on a bracket 53 that is suitably connected on each side to the tractor frame. These outriggers thus permit the members 35 to swing together laterally and, due to the pivotal mounting of the bearing 52, will also permit the members 35 at their outer ends to rise and fall independently in following the irregularities of the ground, or to be lifted together to raise the cultivator attachments from the ground.

It is to be understood that the detailed description of the cultivator attachments and their mounting supports above set forth are merely for the purposes of illustration as the same form the subject matter of the patent and pending application aforesaid and are not therefore claimed as a part of this application, which is concerned with the provision of means for lifting the cultivator attachments from the ground whenever it is desired to do so.

The pinion 20, mounted loosely on the steering rod 21, is adapted to be clutched to said rod by a clutch sleeve 54 which is splined on the rod and adapted to co-act with clutch teeth rigid with the hub 55 of the pinion 20. It will be noted that the spline 56 does not extend under the hub 55. The clutch collar is surrounded by a yoke 57 formed on the downturned end of a clutch shift rod 58 which is slidable in a bearing 59 mounted on the standard bearing 22 on the bracket 16, the bearing 59 being formed integral with or mounted on the bracket 16 as conditions may make desirable. The rear end of the shift rod 58 is provided with an upturned handle 60 disposed adjacent to the steering wheel 23 so that it can be readily manipulated by the driver while controlling the steering wheel. In intermediate position the clutch frees the steering mechanism.

Referring to Fig. 3, it will be observed that the bottom end of the yoke 57 below the clutch collar 54, is bent forwardly at right angles to form a detent 61 which is adapted, in full forward position, to engage the teeth on a gear segment 62 attached by bolts 63 to or otherwise mounted on the top of the gear sector 13. The position of the parts described is such that when the clutch sleeve is shifted forwardly it will first release the pinion 20, and can then be moved further to engage the tooth segment 62 and lock the steering mechanism for the tractor in its then position. When the pinion 20 is released from the clutch sleeve 54 it is obvious that the tractor steering mechanism is disconnected from the steering rod 21 and that the latter is free to be turned to manipulate the lifting mechanism by turning the steering rod which will turn the grooved pulley 26, causing it, through the flexible lifts 27 or 28, to raise the rigid arm or bridle 30, and thus lift the free ends of the cultivator attachment and their supporting grooved wheels 37 from the ground, whereupon the clutch sleeve can be shifted to again restore control of the steering mechanism to the wheel 23 and the tractor can be guided around the turn or backed, the bridle 30 rising and falling with the steering movements of the rod 21.

In operation, leaving the pinion 20 clutched to the steering rod 21, as the tractor is turned sharply to the right or the left, substantial angular rotation will be imparted to the pulley 26 and the ground wheels 37 and cultivator attachments will be lifted from the ground automatically, the parts being capable of design to give any desired ratio of lifting motion to a given angular motion of the steering wheel. When the tractor steering mechanism resumes position for a forward drive the cultivator attachments will be automatically lowered to the ground to their normal operating position. When it is desired to lift the ground wheels independently of the steering mechanism, the clutch collar 54 is disengaged from the pinion 20 and the steering rod can then be turned freely to lift the ground wheels and cultivator parts, the clutch being shiftable either to lock the steering mechanism or to restore control of it to the steering rod at any time that such control is needed. There will be sufficient length in the flexible connections 27 or 28 to permit a reasonable range of steering control should the steering rod while holding the wheels lifted from the ground be again connected with the tractor steering mechanism through the clutching of the pinion 20 to the steering rod. By attaching the flexible connections 27, 28 to the center of the rigid support or bridle 30, the latter is free to swing angularly to permit the wheels 37 to conform to the slope of the ground and yet will always lift both wheels at the same time, as the cultivating elements connected to the ends of the members 35 will at all times substantially balance each other.

By the arrangements described, the cultivator attachments wherever located can be brought under the ready and convenient control of the tractor operator and he can at any time obtain free dirigibility of the tractor by manipulating the lifting means for the cultivator attachments so that they are held disengaged from the ground, whereupon the tractor can be backed, reversed or swung around with full freedom, as operating conditions may make desirable.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A cultivator attachment for tractors, comprising a transverse member mounted on the tractor and articulated to permit angular movement vertically of its ends, wheel supports for said ends, cultivator appliances connected to said member, and unitary steering and lift actuating means mounted on the tractor and controllable from the driver's seat for lifting both said wheel supports from the ground simultaneously.

2. A cultivator attachment for tractors having manually operable wheel steering mechanism, comprising vertically movable draft elements connected to the tractor, cultivating appliances connected to said elements, an actuator operable by the steering mechanism of the tractor, and connections therefrom to the said draft elements to lift them from the ground, said connections comprising a rigid element flexibly connected at its ends to said elements and flexibly connected at its center to said actuator.

3. A cultivator attachment for tractors, comprising vertically movable draft elements mounted on the tractor, cultivating appliances connected to said elements, steering mechanism for the tractor comprising a steering rod carrying a grooved pulley, a flexible connection fast to the pulley, a rigid bar suspended by said connection from both sides of the pulley, and links connecting the bar to the ends of the draft elements.

4. The combination with a tractor having a steering wheel and rod and steering mechanism operable thereby, of cultivating attachments, means operable by rotation of the tractor steering rod to lift them from the ground, and a clutch controlled driving connection between the rod and the steering mechanism.

5. The combination of a tractor having a steering wheel, a steering rod operable by rotation of the wheel, a clutch controlled drive for said rod to steer the tractor, cultivating attachments connected to the tractor, and means operable by rotation of the steering rod to lift said attachments from the ground.

6. The combination of a tractor having a steering wheel, a steering rod operable by rotation of the wheel, a clutch controlled drive for said rod to steer the tractor, cultivating attachments connected to the tractor, means operable by rotation of the steering rod to lift said attachments from the ground, and means to lock the steering mechanism when unclutched from said rod.

7. The combination of a tractor having a wheel operated steering rod, a clutch controlled drive therefrom to said tractor steering wheels, a shift means for the clutch, a lock for the steering drive operable by said clutch shift after it has disengaged the clutch, and cultivator appliances having means to lift them operable by rotation of the steering rod.

8. The combination with a tractor having dirigible front supporting means and a steering shaft extending forwardly above said supporting means, of implement carrying frames comprising draft members extending outwardly at each side of the tractor, means for pivotally connecting said members to the front of the tractor for movement in transverse vertical planes, and means for moving the draft members on said pivotal connections comprising a flexible element connected to the steering shaft for winding thereon and connections between said flexible element and the outer portions of the respective draft members.

In testimony whereof I affix my signature.

DAVID K. TROTTER.